United States Patent [19]

Shikaumi

[11] Patent Number: 4,719,485
[45] Date of Patent: Jan. 12, 1988

[54] AUTOMATIC FOLLOW-UP DEVICE FOR CAMERA

[75] Inventor: Masao Shikaumi, Kanagawa, Japan

[73] Assignee: Canon Kabushiki Kaisha

[21] Appl. No.: 870,618

[22] Filed: Jun. 4, 1986

[30] Foreign Application Priority Data

Jun. 6, 1985 [JP] Japan .................................. 60-123051
Jun. 14, 1985 [JP] Japan .................................. 60-129481

[51] Int. Cl.⁴ .......................... G03B 3/00; G03B 29/00
[52] U.S. Cl. ......................................... 354/400; 354/81
[58] Field of Search ............... 354/400, 75, 76, 81, 354/195.1, 202, 293, 295; 352/53, 140, 243; 358/108, 113, 225, 227

[56] References Cited

U.S. PATENT DOCUMENTS 3,314,350  4/1967  Husum ........................... 354/195.1
4,162,052  7/1979  Lamelot ......................... 358/113 X
4,189,747  2/1980  Funari ........................... 358/113 X Primary Examiner—W. B. Perkey
Attorney, Agent, or Firm—Toren, McGeady & Associates

[57] ABSTRACT

An automatic follow-up device for a camera is arranged to automatically capture a heat source, such as a human being, within a photographing field on the notion that a moving object to be photographed is often a human being; and to automatically adjust the magnification of a photo-taking optical system in such a way as to adjust the size of the image of the object to have a given portion of an image plane allocated to the object irrespective of the distance to the object.

3 Claims, 27 Drawing Figures

FIG.2 FIG.3
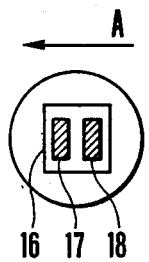 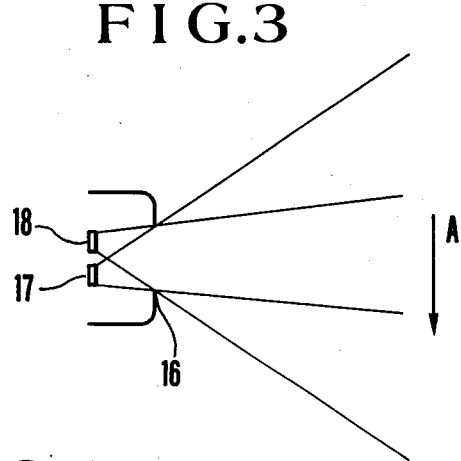
FIG.4
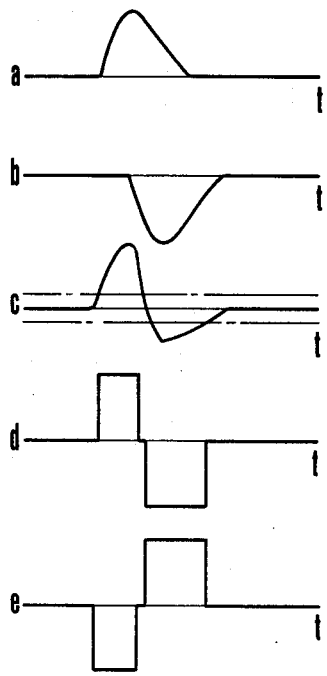

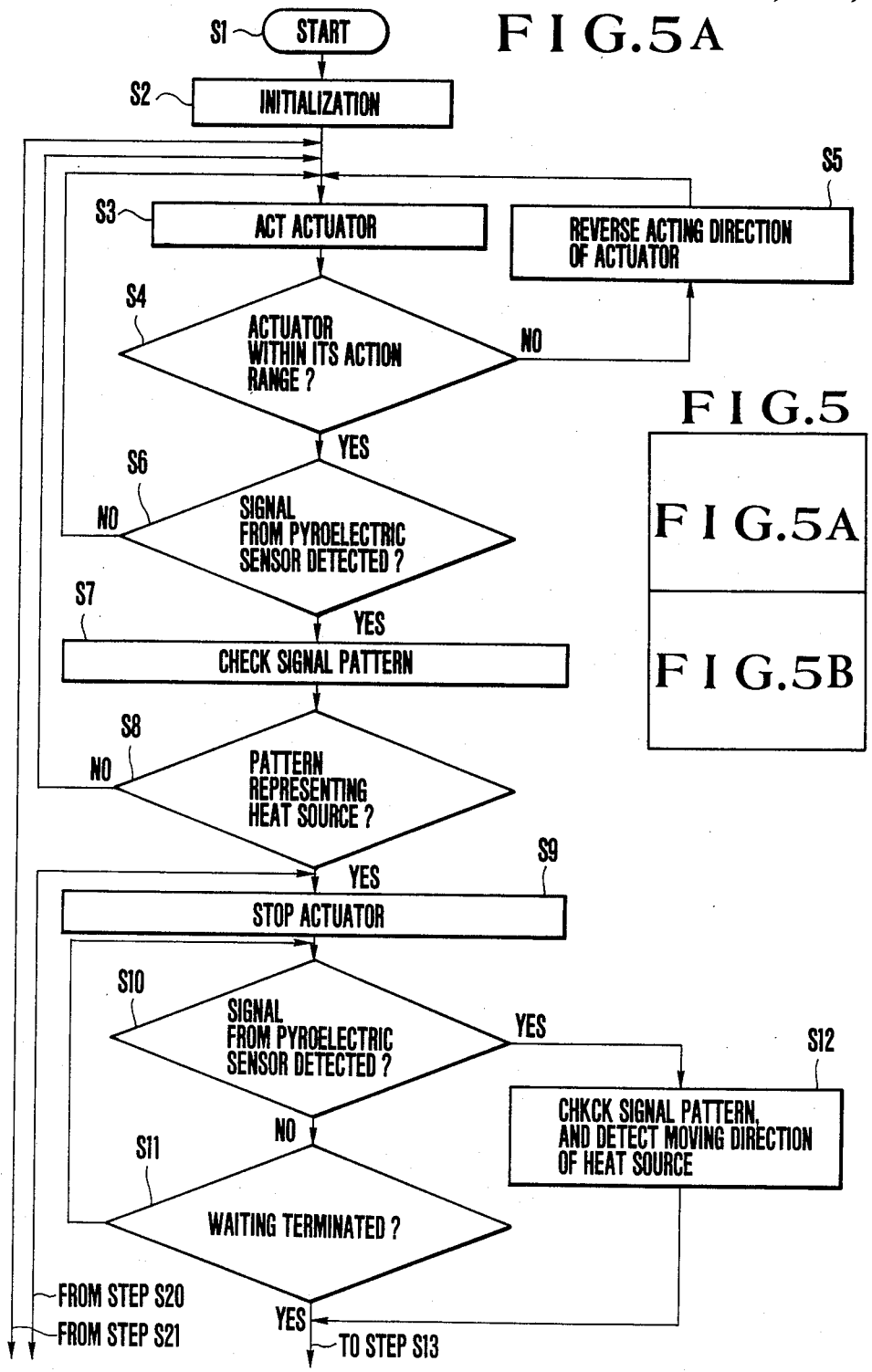

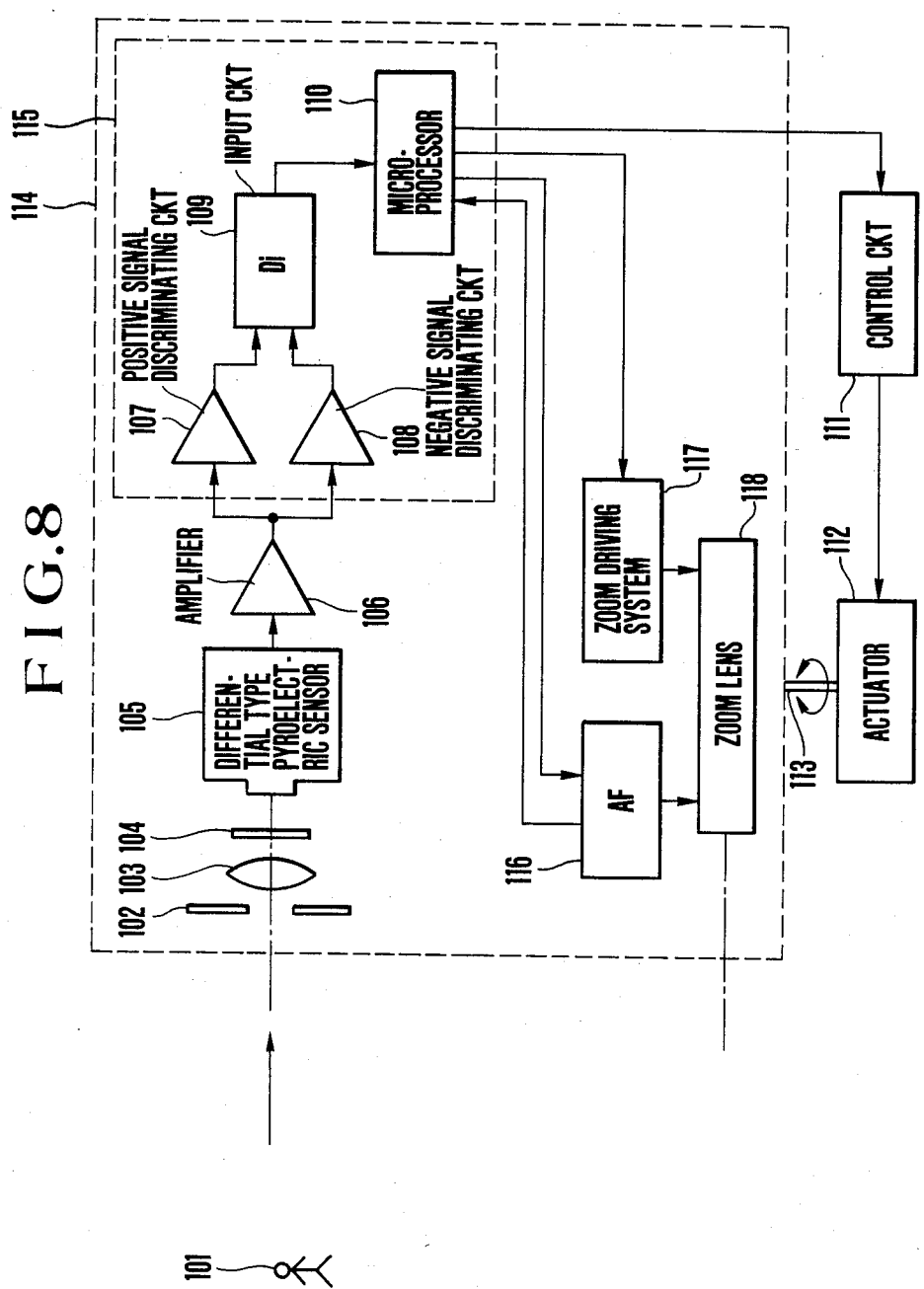

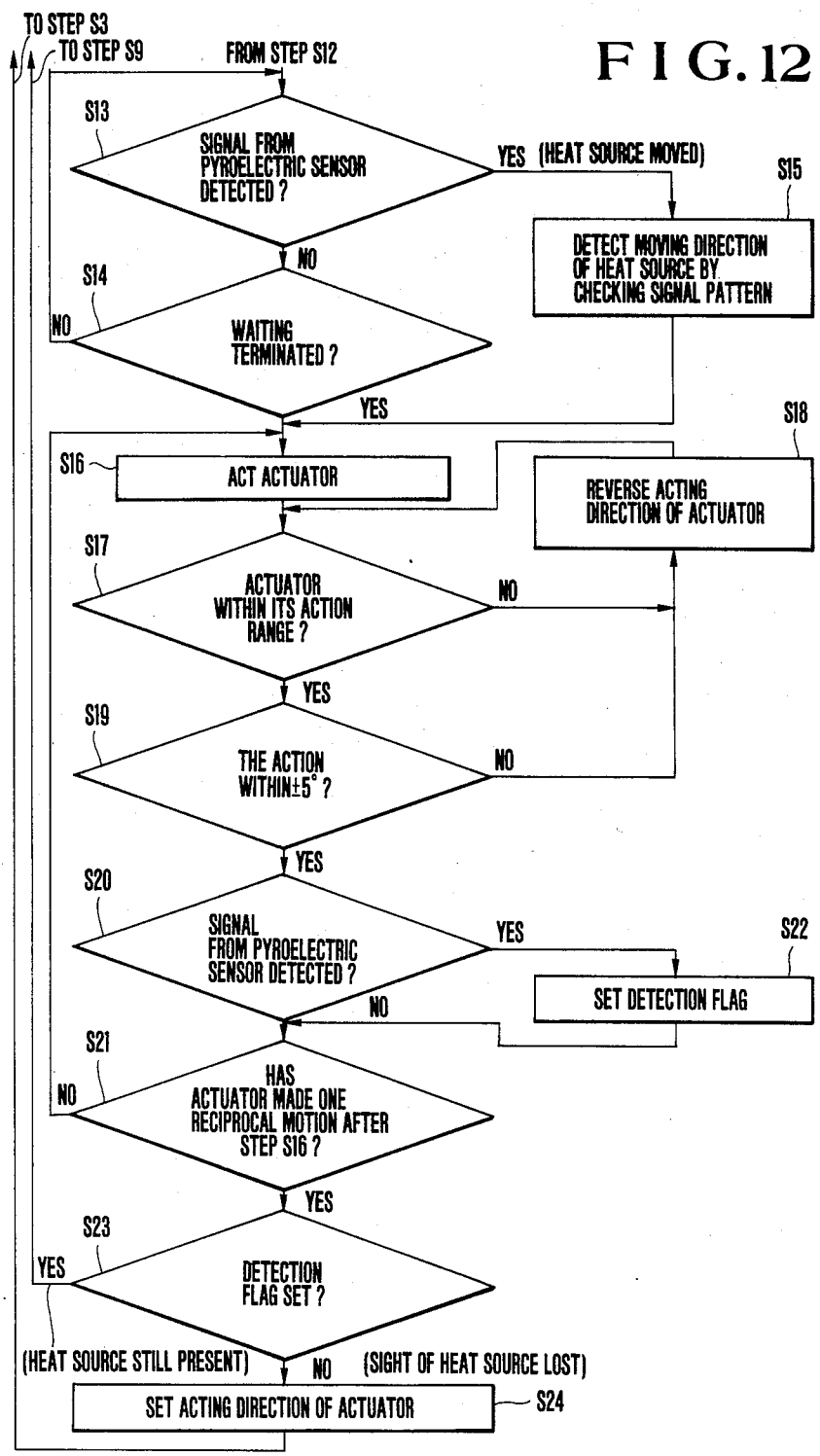

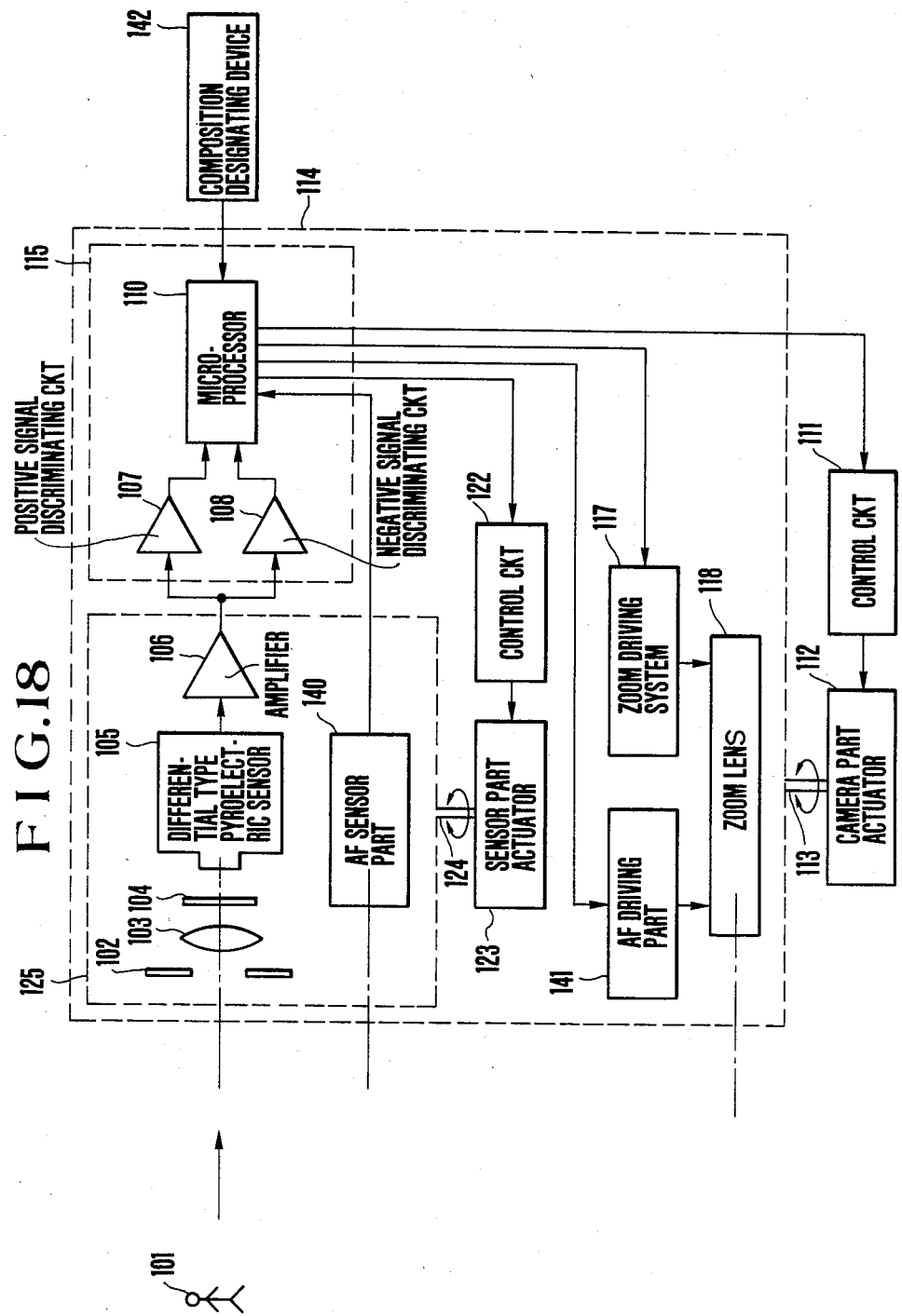

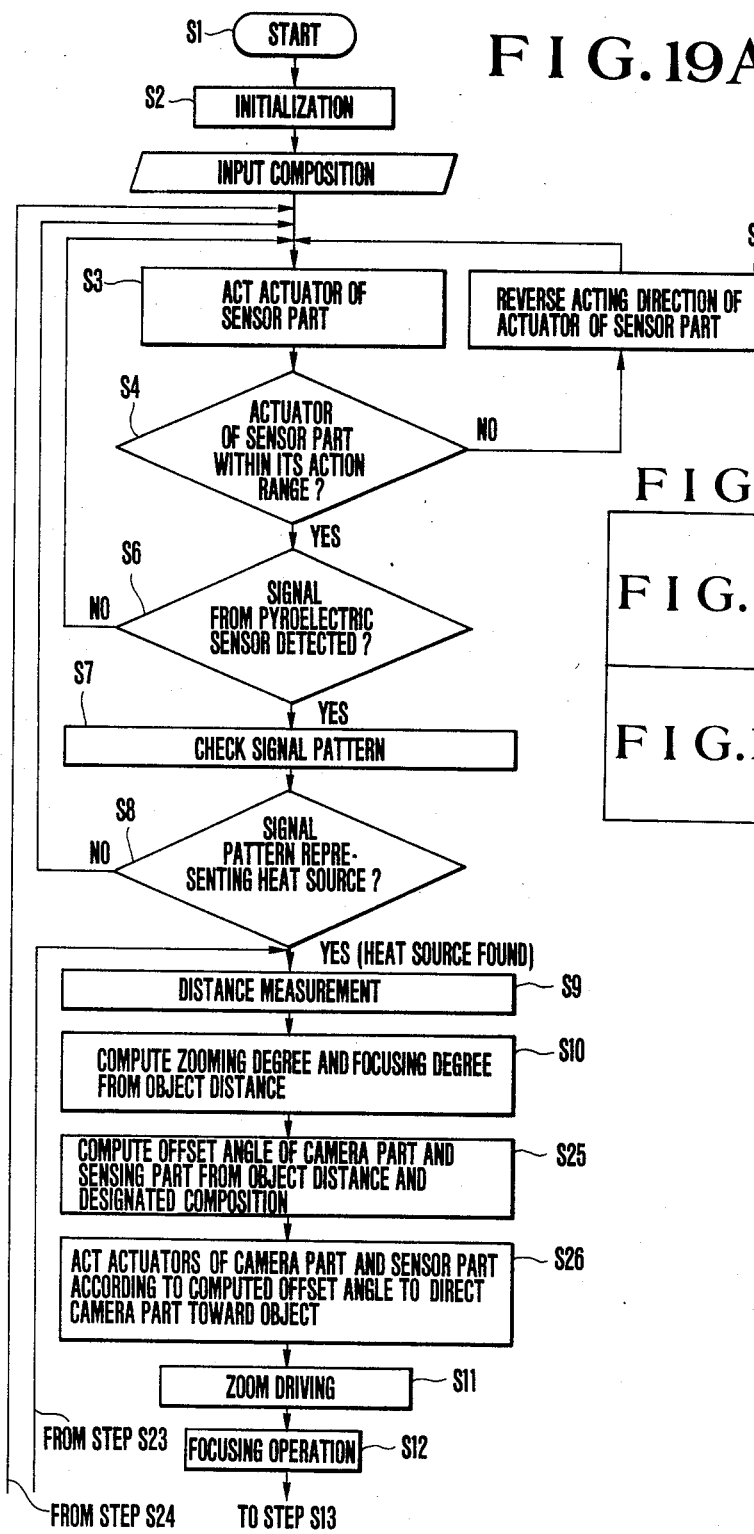

4,719,485

AUTOMATIC FOLLOW-UP DEVICE FOR CAMERA

BACKGROUND OF THE INVENTION

1. Field of the Invention

This invention relates to an automatic followup device adapted for a camera arranged to have an object to be photographed always kept within a field by automatically following up the object.

2. Description of the Related Art

It has been possible for a photographer to take a picture of himself or herself or to take a picture of a moving object while staying away from a camera by means of a pan-head equipped with a remote control device.

However, it has been not easy to have the image of a moving object adequately positioned within the field by means of the remote control device. Further, since the remote control device must be manually operated, it has been impossible to follow a moving object up in the absence of an operator of the remote control device.

SUMMARY OF THE INVENTION

It is an object of this invention to provide an automatic follow-up device for a camera arranged to use temperature detecting means for automatically capturing a heat source, such as a human being, within a photographing field on the notion that a moving object to be photographed is in many cases a human being.

It is another object of this invention to provide an automatic follow-up zooming device which is arranged to automatically capture a heat source, such as a human being within a photographing field; and to automatically adjust the magnification of a photo-taking optical system in such a way as to adjust the size of the image of the object to have a given portion of an image plane allocated to the object irrespective of the distance to the object.

These and further objects and features of this invention will become apparent from the following detailed description of embodiments thereof taken in connection with the accompanying drawings.

BRIEF DESCRIPTION OF THE DRAWINGS

FIGS. 1 to 5 show an automatic follow-up device for a camera arranged as a first embodiment of this invention. Among these drawings, FIG. 1 is a block diagram showing the whole arrangement of the embodiment. FIG. 2 is a front view showing a differential type pyroelectric infrared ray sensor. FIG. 3 is an illustration of the field of the pyroelectric sensor. FIG. 4 is an illustration of signals produced from the same sensor according as a heat source moves. FIGS. 5A and 5B are flowcharts showing the algorithm of a microprocessor shown in FIG. 1.

FIG. 8 is a block diagram showing the arrangement of another embodiment.

FIGS. 12, 12A and 12B are flowcharts showing the algorithm to be carried out by a microprocessor shown in FIG. 12.

FIG. 18 is a block diagram showing a still further embodiment of this invention.

FIGS. 19, 19A, and 19B are flowcharts showing the algorithm to be carried out by a microprocessor shown in FIG. 18.

DETAILED DESCRIPTION OF THE PREFERRED EMBODIMENTS

Figure 1:
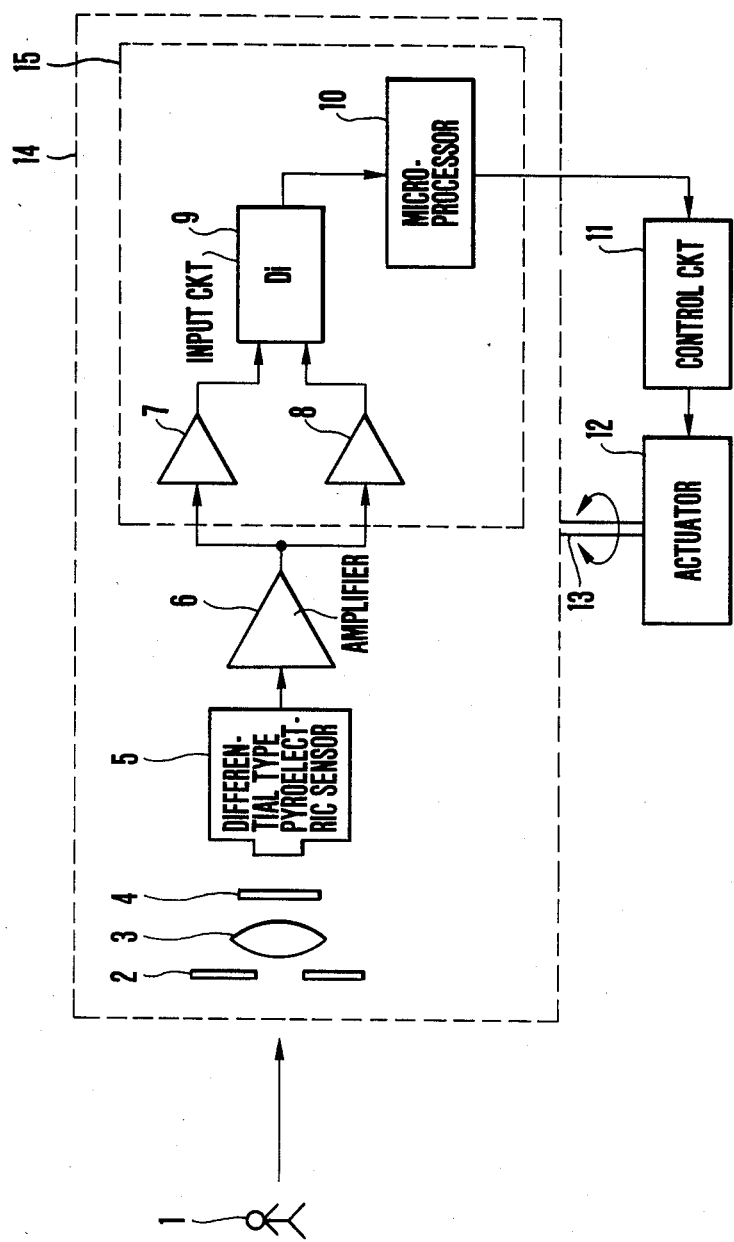

FIG. 1 shows a first example of embodiment of this invention in a block diagram. The embodiment is shown in a state of having an automatic follow-up device arranged within a camera 14. The illustration includes a diaphragm 2 which is arranged to define the field of a differential type pyroelectric infrared ray sensor 5; a lens 3 arranged to condense infrared rays coming from an object 1 to be photographed; a filter 4 arranged to cut light of any wavelength other than those of near infrared rays for the purpose of removing the adverse effect of light such as sunlight; and the pyroelectric infrared ray sensor 5 arranged to detect the infrared rays coming from the object. The sensor 5 includes a plurality (two in this specific embodiment) of detecting elements which have different fields and are differentially connected. The optical axis of the sensor 5 approximately coincides with that of a photo-taking lens. An amplifier 6 is arranged to amplify a signal produced from the differential type pyroelectric infrared ray sensor 5. Positive and negative signal discriminating circuits 7 and 8 are respectively arranged to produce high level outputs when the signal produced from the amplifier 6 is a positive or negative signal exceeding a given threshold value. The outputs of these discriminating circuits 7 and 8 are arranged to be supplied via an input circuit 9 to a microprocessor 10. The microprocessor 10 is arranged to control the rotation of a camera 14 by driving an actuator 12 which is connected to the camera 14 and a driving shaft 13 via a control circuit 11. These components 7 to 10 jointly form a discriminating part 15 for detecting the moving direction of the object to be photographed. The components 2 to 10 are all mounted in the camera 14.

Referring to FIGS. 2, 3 and 4, this embodiment operates as follows: FIG. 2 is a front view showing the differential type pyroelectic infrared ray sensor 5. The two pyroelectric elements 17 and 18, which are of a rectangular shape, are arranged in parallel with each other as viewed from the aperture part 16 of the sensor. The pyroelectric elements 17 and 18 are differentially connected within the sensor 5 and are mutually temperature compensated, producing differential signals. The arrangement of the sensor of this type is already known. FIG. 3 shows the two pyroelectric elements as viewed from above. As shown, they have different fields from each other. Assuming that a heat source, such as a human being, exists in front of this sensor 5, when the heat source moves from the outside of the sensor field to the inside of the field in the direction of arrow A as shown in FIG. 3, the pyroelectric elements 17 and 18 generate their signals at different points of time as their fields differ from each other. The signals produced from these pyroelectric elements 17 and 18 are as shown in FIG. 4. Referring to FIG. 4, a signal a is produced from the element 17 and a signal b from the element 18. Since these elements 17 and 18 are differentially connected, the plus and minus signs of these signals a and b are opposite to each other. The output of the sensor 5, which is differentially connected, becomes a+b and becomes as shown at a part c in FIG. 4. Then, with the signal c compared with, threshold values which are indicated by one-dot-chain lines, the signal c is converted into a digital value. The digital conversion results in a signal d as shown at a part d in FIG. 4. In case that the heat source moves in a direction reverse to the direction of arrow A, the signals of the pyroelectric elements 17 and 18 come to have converse generating timings. In that case, the output corresponding to the output d becomes as shown at a part e in FIG. 4. The pattern of the output of the sensor 5 thus changes with the moving direction of the heat source. Therefore, the moving direction of the heat source can be detected by detecting the pattern. The above-stated movement of the heat source in this instance means movement in relation to the sensor. The same pattern obtains when the sensor 5 makes a scanning movement while the heat source is at rest. The position of the heat source is likewise detectable also in that instance.

The heat source can be followed up by combining the discrimination of the moving direction thereof and detection of the position thereof. This is the operating principle of the embodiment shown in FIG. 1. In the embodiment, signals produced from the pyroelectric sensor 5 are digitized by the positive signal discriminating circuit 7 and the negative signal discriminating circuit 8. The digitized signals thus obtained are supplied via the input circuit 9 to the microprocessor 10 for detecting the patterns of the signals d and e shown in FIG. 4.

Figure 5B:
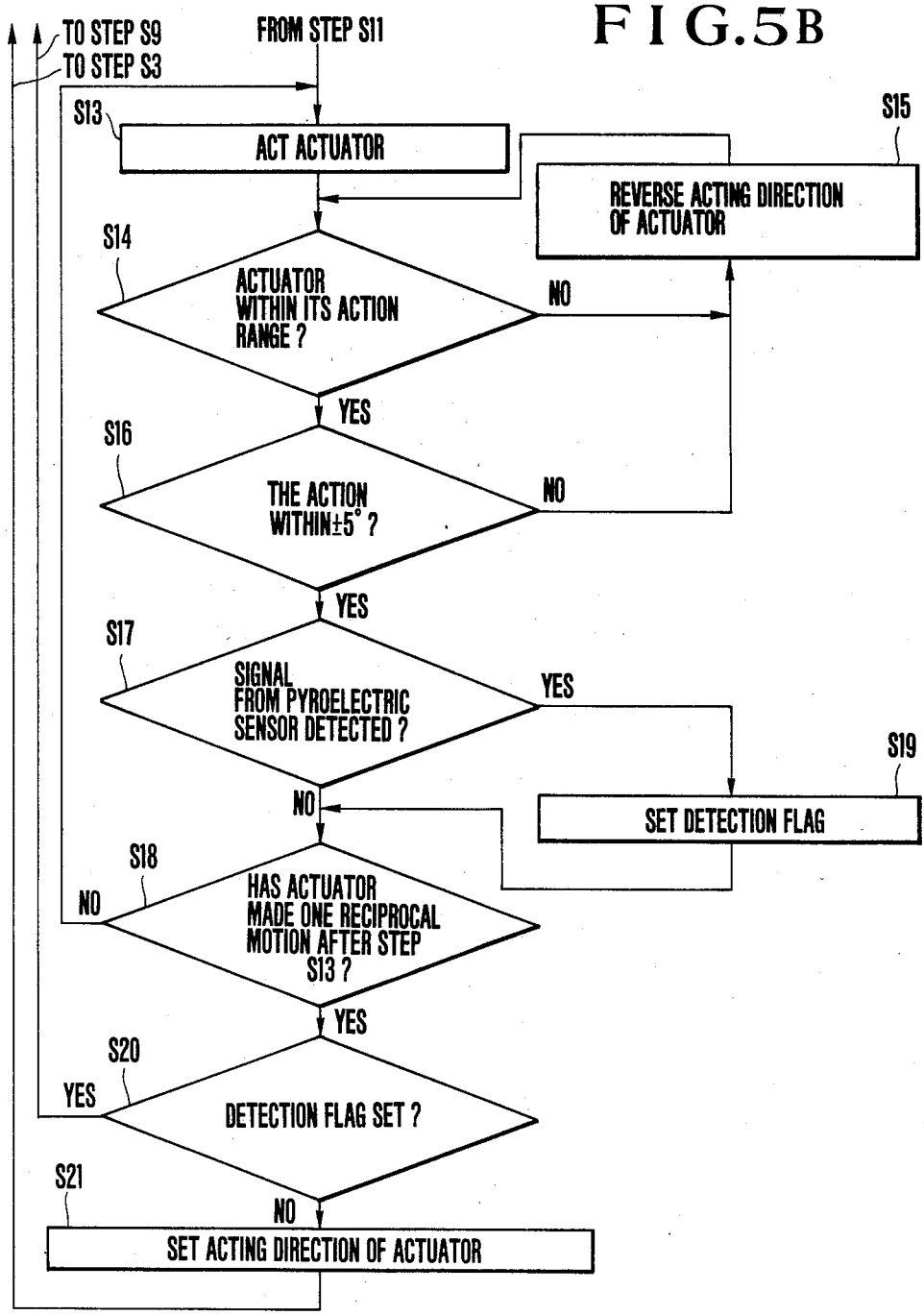

Referring now to FIG. 5 which is a flowchart, the algorism to be carried out by the microprocessor 10 is as described below:

Steps No. 1 and No. 2 (hereinafter all step numbers will be expressed as S1, S2, etc.): After the start of the device, the internal state of the micro-processor 10 is first initialized.

S3: At a next step S3, the actuator 12 is driven in one direction.

S4: At this step, the action of the actuator 12 is checked to find whether it is within an action range thereof. If it is found to be within the range, the microprocessor 10 proceeds to step S6. If not, it proceeds to a step S5.

S5: The direction in which the actuator 12 is driven is reversed. In the event that the actuator 12 has reached a point outside of the moving range thereof at the step S4, the operation of the microprocessor also proceeds to this step.

S6: A check is made to see if the signal of the differential type pyroelectric sensor 5 has been produced within the acting range of the actuator 12. If the signal is found not produced at this step, the operation comes back to the step S3. If it is found to have been produced, the operation proceeds to a step S7.

S7 and S8: At these two steps S7 and S8, the pattern of the signal produced from the pyroelectric sensor 5 is detected and checked to see if the pattern represents a heat source. In other words, a discrimination is made at these steps to find whether the pattern represents a heat source for the purpose of preventing an erroneous operation resulting from erroneous signal detection caused at the step S6 by some noise component of the output of the pyroelectric sensor. Further, the signal pattern represents a heat source when the signal includes pulses in the order of a positive pulse, and a negative pulse or in the order of a negative pulse and a positive pulse as shown at the parts d and e in FIG. 4.

S9: Since a heat source has been found at the preceding step, the action of the actuator 12 is brought to a stop.

S10: While the actuator 12 is at rest, the pyroelectric sensor 5 is checked to find if a signal is produced from the sensor 5. If a signal is detected, the heat source is considered to have moved and the operation proceeds to a step S11.

S11: A check is made to see if a predetermined length of time has elapsed after the actuator 12 came to a stop at the step S9. If not, the operation comes back to the step S10. If it is found to have elapsed, the operation proceeds to a step S13.

S12: If a signal from the sensor 5 is detected at the step S10, the signal pattern is checked for finding the moving direction of the heat source.

S13: In case that the operation comes from the step S11 to this step S13, the actuator 12 is caused to act in either one of its acting directions. If the operation comes from the step S12, the actuator 12 is caused to act in the direction found at the step S12.

S14: The operation shifts to a step S16 if the actuator 12 is within its acting range or to another step S15 if it is not.

S15: The acting direction of the actuator 12 is reversed in the same manner as at the step S5.

S16: The action of the actuator 12 is checked to see if its angle is within 5 degrees. The operation proceeds to a step S17 if it is within 5 degrees or comes to the step S15 if not.

S17: A check is made to see if a signal is produced from the pyroelectric sensor 5. The operation at this step S17 is similar to the step S6.

S18: The actuator 12 is checked to see if it has made one reciprocal motion from a position set at the step S13. More specifically, it is checked to find whether the action of the actuator 12 has been twice reversed at the step S15 and the actuator 12 has come back to its action starting position set at the step S13. The operation comes back to the step S13 if the above-stated action of the actuator 12 has not been completed or advances to a step S20 if it has been completed.

S19: A detection flag is set in case that the presence of a heat source is ascertained from the output of the pyroelectric sensor 5 at the step S17.

S20: A check is made to see if the detection flag is set. If it is found to have been set, it indicates that the heat source is within the field of the sensor 5. In that event, the operation comes to a step S9 to bring the actuator 12 to a stop. If the flag is found not to have been set, the operation proceeds to a step S21.

S21: In the event of that the detection flag is not set, it indicates that the heat source has gone out of sight. In that event, at the step S21, the acting direction of the actuator 12 is again set on the basis of the operation performed at the step S12. The operation then comes to the step S3.

Among the steps described, the steps S3 to S8 constitute a loop which moves or deflects the pyroelectric sensor 5 to a great extent. The steps S14 to S18 form another loop which moves or deflects the sensor 5 within a smaller angle range not exceeding 5 degrees. In other words, in the case of this specific embodiment, the sensor 5 is first moved or deflected to a greater degree to find out a heat source. Then, during a waiting period, a given period of time is allowed to pass or, if a signal is detected during the waiting period, the sensor is moved or deflected to a smaller degree to ascertain the presence of the heat source in front of the device.

At the steps S9 to S12 of the flowchart, the signal of the pyroelectric sensor 5 is continously checked to see if it is produced from the sensor over a given period of time set at the step S11. If the heat source moves during this given period of time, the operation shifts from the step S10 to the step S12 and the steps subsequent thereto for causing the actuator 12 to operate. Further, even if the heat source does not move during the given period of time, the actuator 12 is caused to make a reciprocal motion to a small degree of angle (5° in this embodiment) after the lapse of a predetermined period of time at the step S13 and steps subsequent thereto for confirmation that the heat source does not move and stays within the field of the actuator 12. In this embodiment, a lens is used for the optical system of the sensor 5. However, the use of the lens may be replaced with use of a reflecting mirror. The discriminating part 15 need not be mounted on the camera 14. In the case of this embodiment, the invention is applied to a camera. However, the invented device may be mounted on a tripod head and arranged to drive the tripod head.

Figure 6:
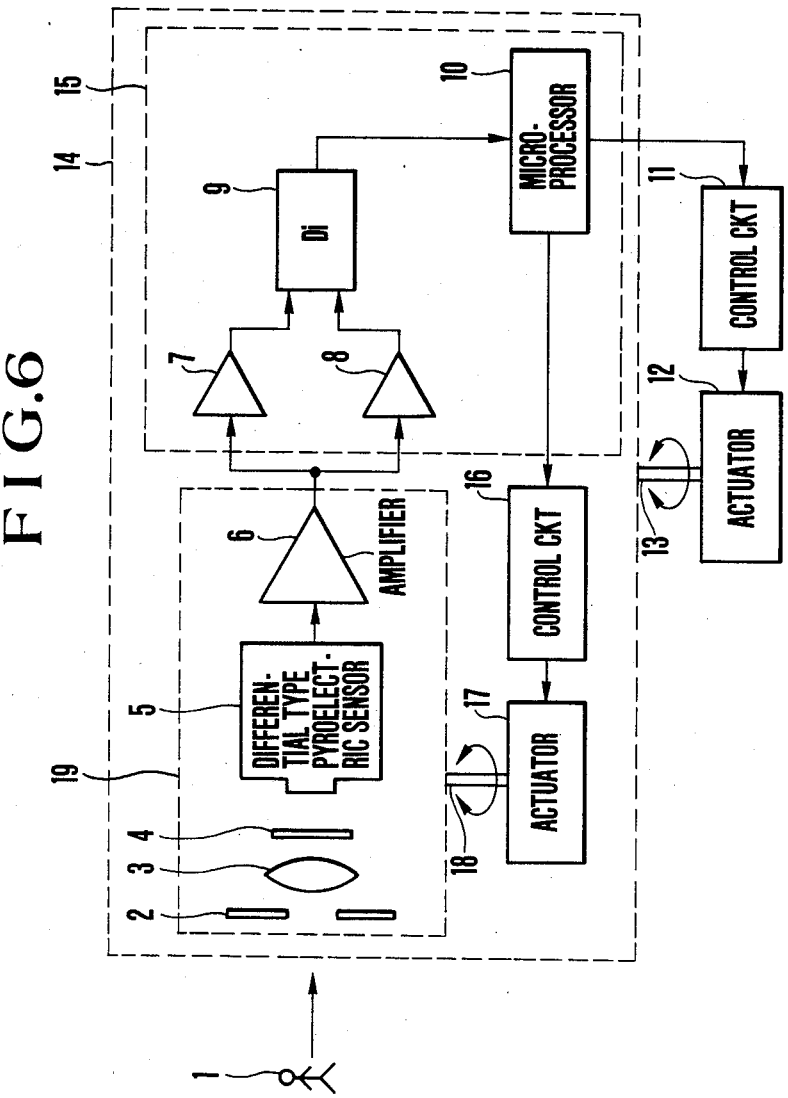
FIG. 6 is a block diagram showing the arrangement of a second embodiment of this invention.

Next, a second embodiment of this invention is arranged as follows: FIG. 6 shows, in a block diagram, the arrangement of the second embodiment. In this case, an actuator 17 is arranged to drive only a sensor part 19 independently of a camera part 14 in combination with a driving shaft 18 and a control circuit 16. With the embodiment arranged in this manner, a follow-up operation can be accomplished in the following manner: During the search for a heat source, a scanning operation is performed solely by means of the sensor part 19; and the camera part is driven to direct it toward a heat source only when the heat source is detected. In the first embodiment, the camera part 14 and the sensor 5 are arranged to be driven together. Therefore, in confirming the presence or absence of a heat source within the field by deflecting the actuator 12 to a small degree of angle as mentioned at the steps S13 to S17 in the flow chart of FIG. 5, the field of the camera varies to a small degree. This fluctuation hinders the photographer in observing the field of the camera. This shortcoming of the first embodiment is eliminated by the second embodiment, wherein the actuator 12 is allowed to drive the camera part 14 only when a heat source is detected. Since it is only the sensor part 19 that is to be driven in scanning, the inertia of the device becomes smaller than in driving the sensor part 19 and the camera part 14 together, so that the scanning operation can be accomplished at a higher speed.

In the foregoing example, the device is arranged to make detection in the horizontal direction. However, it is possible to make a two dimensional follow-up operation with a sensor arranged to detect a heat source in the horizontal direction and another sensor arranged to detect a heat source in the vertical direction. Further, referring to FIG. 7, it is possible to use a two-output differential type pyroelectric sensor consisting of four pyroelectric elements of the same shape I, II, III and IV. The elements I and II and the elements III and IV are respectively differentially connected to give two outputs. The use of this signal sensor permits a two-dimensional follow-up operation which can be accomplished by examining the signal patterns of the two outputs. In this instance, the actuator of FIG. 6 is replaced with two actuators, one for the horizontal direction and the other for the vertical direction.

FIG. 8 shows another embodiment of this invention. In case that an object to be photographed is located in a peripheral part of the field, the object tends to come outside of the field when the lens is driven to have a longer focal length during a zooming operation performed thereon. The embodiment shown in FIG. 8 solves this problem. The illustration includes a diaphragm 102 which is arranged to define the field of a differential type pyroelectric infrared ray sensor 105; a lens 103 which is arranged to condense infrared rays coming from an object 101; a filter 104 which is arranged to cut any light of wavelength less than that of near infrared rays for the purpose of removing the adverse effect of light such as sunlight; and the pyroelectric infrared ray sensor 105 which is arranged to detect the infrared rays coming from the object and is composed of a plurality (two in this instance) of detecting elements having different fields from each other, these elements being differentially connected. The optical axis of the sensor 105 coincides with that of a zoom lens 118. An amplifier 106 is arranged to amplify a signal produced from the sensor 105. Positive and negative signal discriminating circuits 107 and 108 are arranged to produce high level outputs when the signal produced from the amplifier 106 is a positive signal or a negative signal of a value exceeding a given threshold value. The outputs of these discriminating circuits 107 and 108 are arranged to be supplied via an input circuit 109 to microprocessor 110. The microprocessor 110 is arranged to produce operating instructions to an automatic focusing device 116 and a zoom driving system 117; and to drive, via a control circuit 111, an actuator 112 which is connected to a camera part 114 and a driving shaft 113 to operate the camera part 114 until data for a distance to the object 101 is obtained from the automatic focusing device 116. The automatic focusing device 116 is arranged to measure the distance to the object in response to the operating instruction received from the microprocessor 110; to supply the microprocessor 110 with the distance data; and to adjust the focal point of the zoom lens 118. The microprocessor 110 computes a zooming degree from the distance data and a present size of a space to be occupied within an image plane by the image of the object to be photographed. Upon completion of this computation, the microprocessor 110 causes the zoom driving system 117 to drive the zoom lens 118 accordingly.

These parts 107 to 110 form a discriminating part 115 which detects the moving direction of the object. The parts 102 to 110 are mounted on the camera part 114.

Figure 9:
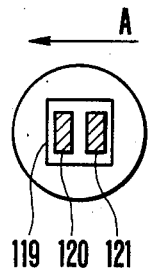
FIGS. 9 and 10 are a front view and a top view of the pyroelectric infrared ray sensor which is shown in FIG. 8.
Figure 10:
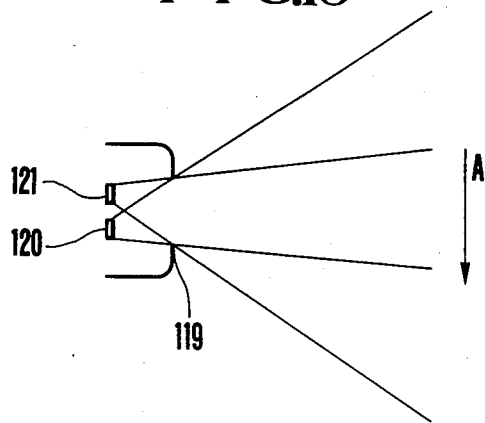
Figure 11:
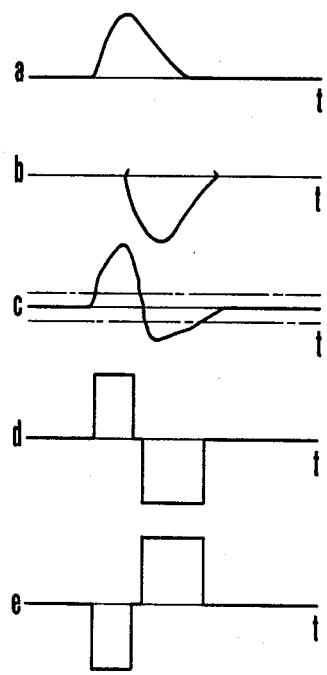
FIG. 11 is a waveform chart showing the outputs of the above-stated pyroelectric infrared ray sensor.

Referring to FIGS. 9, 10 and 11, the embodiment operates as follows: FIG. 9 is a front view showing the differential type pyroelectric infrared ray sensor 105 which is shown in FIG. 8. The two pyroelectric elements 120 and 121 of the sensor 105 are arranged in parallel as viewed from an aperture part 119 of the sensor 105. These sensor elements 120 and 121 are differentially connected within the sensor 105 and are mutually temperature compensated, producing a differential signal in a known manner. FIG. 10 shows the two pyroelectric elements 120 and 121 of the sensor 105 as viewed from above. As shown, these elements have different fields. When a heat source, such as a human being, moves from the outside of the field of the sensor 105 into the field in the direction of arrow A in front of the sensor 105, the signal generating time of one of these elements 120 and 121 differs from that the other because of the difference between their fields. In this instance, the sensor 105 produces signals as shown in FIG. 11. Referring to FIG. 11, a part a shows a signal produced from the pyroelectric sensor element 120. A part b shows a signal produced from the other element 121. Since these elements are differentially connected, the positive and negative signs of these signals a and b are opposite to each other. The sensor 105 which is thus differentially connected produces an output a+b as a signal c as shown at a part c of FIG. 11. When this signal c is converted into a digital value by comparing it with threshold values which are indicated by one-dot-chain lines, the signal c becomes a signal d as shown at a part d in FIG. 11. If the heat source moves in the direction reverse to the direction of arrow A, the signal generating points of time of these elements 120 and 121 become reverse to the relation mentioned above. Then, the output, corresponding to the signal d, becomes a signal e as shown at a part e of FIG. 11. Thus, the pattern of the output of the sensor varies with the moving direction of the heat source. Hence, the moving direction of a heat source is detectable by checking the output of the sensor for its pattern.

While the above description covers a case where a heat source moves, the signal pattern shown at a part d or e in FIG. 11 relates to movement of the heat source and the sensor relative to each other. The signal pattern is likewise obtainable, therefore, when a scanning operation is performed with the sensor while the heat source is at rest. Therefore, the position of a heat source is detectable by such a scanning operation. A heat source thus can be followed up by carrying out a discrimination of the moving direction of the heat source in combination with detection of the position thereof.

Figure 12A:
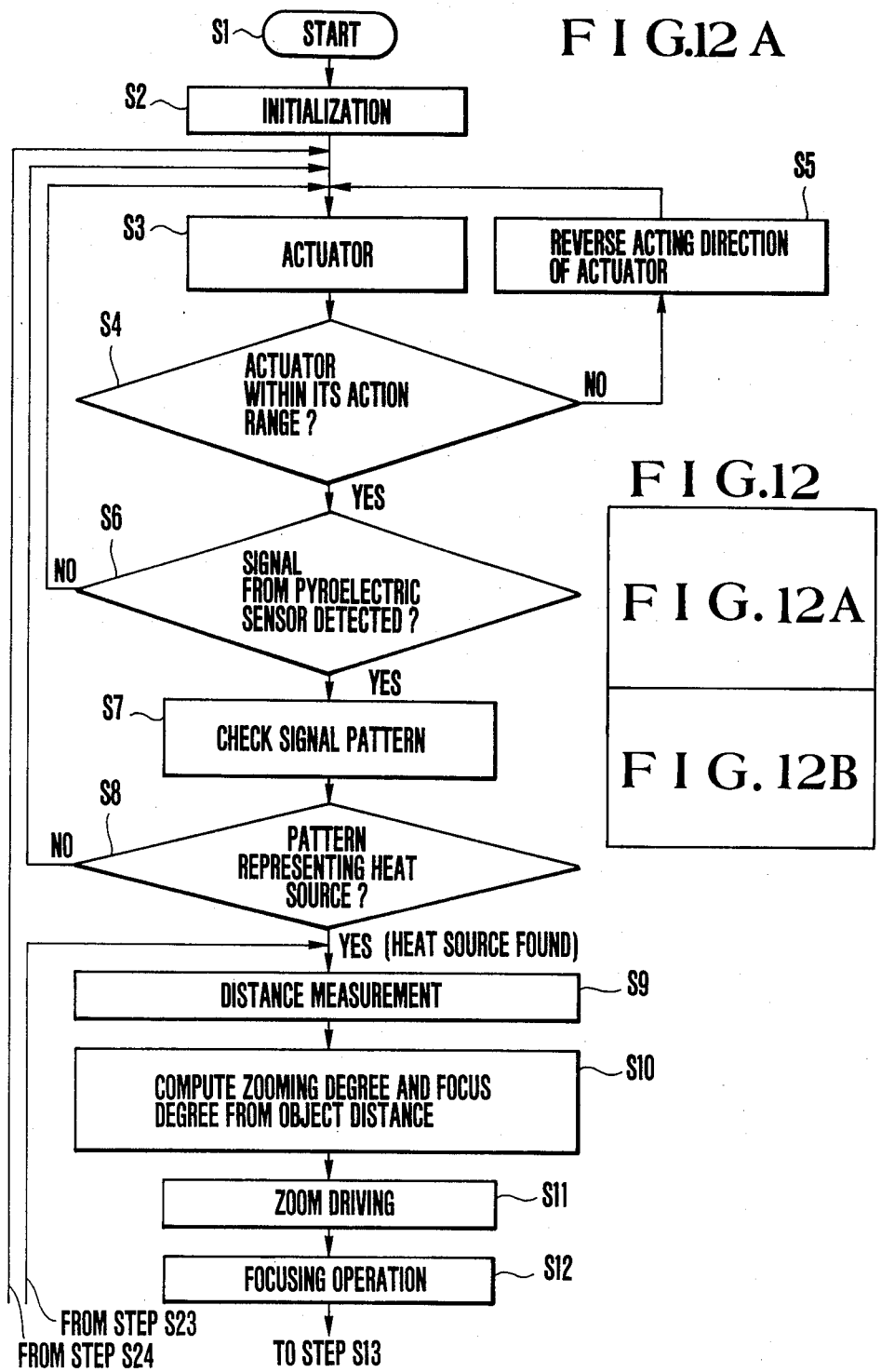

Referring to FIG. 12 which is a flowchart the algorithm to be carried out by the microprocessor 110 is as follows:

S1 and S2: With the embodiment started, the internal state of the microprocessor 110 is first initialized.

S3: The actuator 112 is driven in one direction.

S4: At this step, the actuator 112 is checked to see if the action of the actuator 112 is within its action range. If the action of the actuator 112 is found within the action range, the operation of the microprocessor 110 advances to a step S6. If not, the operation proceeds to a step S5.

S5: The driving direction of the actuator 112 is reversed. The operation comes to this step also in the event that the actuator 112 is found to have come to the outside of its moving range at the preceding step S4.

S6: With the actuator having been found to be within its action range, a check is made to see if a signal is produced from the sensor 105. The operation goes back to the step S3 if no signal is found produced or proceeds to a step S7 if a signal is found produced.

S7 and S8: The pattern of the signal produced from the pyroelectric sensor 105 is detected and checked to see if it represents a heat source at the steps S7 and S8. In other words, the signal pattern is examined at these steps to prevent any erroneous operation that might be caused at the step S6 by detection of a signal resulting from a noise component of the output of the sensor 105. In the case of the signal pattern representing a heat source, the signal includes pulses either in the sequence of a positive pulse and a negative pulse, or in the sequence of a negative pulse and a positive pulse, as shown at the parts d and e in FIG. 11.

S9: The automatic focusing device 116 is caused to perform distance measurement to obtain data for a distance to the object to be photographed. In a feasible modification, the actuator 112 may be brought to a stop before the distance measuring action of the step S9 in the same manner as the step S9 of FIG. 5.

S10: The focal length of the photo-taking lens is computed from the object distance obtained at the step S9 and the predetermined size of a space to be occupied by the image of the object within the image plane.

S11: The magnification of the photo-taking lens is adjusted to bring the object image to the predetermined size by driving a zoom ring of the photo-taking lens on the basis of the focal length value obtained at the step S10.

S12: A focusing action is performed according to the object distance obtained at the step S9.

S13: After the focusing action is performed once at the preceding step S12, a check is made to see if any signal is produced from the pyroeletric sensor 105. If a signal is detected, the heat source (or the object) is judged to have moved and the operation comes to a step S15. If no signal is detected, the operation proceeds to a step S14.

S14: A check is made to find if a predetermined period of time has elapsed after the actuator 112 was brought to a stop at the step S12. If not, the operation comes back to the step S13. If it is found to have elapsed, the operation advances to a step S16.

S15: If a signal from the pyroelectric sensor is detected at the step S13, the moving direction of the heat source is detected by discriminating the pattern of the signal.

S16: In case that the operation comes from the step S14 to this step S16, the actuator 112 is caused to act in either direction. If the operation comes from the step S15 to this step, the actuator 112 is caused to act in the direction detected at the step S15.

S17: The operation advances to a step S19 if the actuator 112 is within the action range or proceeds to a step S18 if not.

S18: The acting direction of the actuator 112 is reversed in the same manner as at the step S5.

S19: The action of the actuator 112 is checked to see if it is within an angle of 5 degrees. If so, the operation proceeds to a step S20. If not, the operation goes back to the step S18.

S20: A check is made to see if a signal is produced from the pyroelectric sensor 105. This step is similar to the step S6.

S21: A check is made to see if the actuator 112 has made one reciprocal motion from an action starting position set at the step S16. In other words, this step is arranged to find whether the actuator 112 has made two turns at the step S18 and has returned to the action starting position set at the step S16. If the actuator is found to have not completed the above-stated action, the operation goes back to the step S16. If it is found to have been completed, the operation advances toward a step S23.

S22: A detection flag is set if the presence of a heat source is ascertained from the output of the pyroelectric sensor at the step S20.

S23: A check is made to find if the detection flag is set. If it is found to have been set, the operation comes to the step S9. If not, the operation proceeds to a step S24. In case that the actuator is brought to a stop before the step S9 in the same manner as in the case of the step S9 of FIG. 5, the operation goes back to the step of bringing the actuator to a stop if the detection flag is found to have been set in the same manner as in the case of FIG. 5.

S24: In the event of no detection flag, the sight of the heat source is assumed to have been lost and the operation goes back to the step S12, etc. to again set the acting direction of the actuator 112 and then comes to the step S3.

Among the steps described above, the steps S3 to S8 form a loop whereby the pyroelectric sensor is moved or deflected to a great degree. The steps S17 to S21 form a loop whereby the sensor is deflected to a smaller degree of angle not exceeding 5 degrees. In short, this embodiment is arranged to first find a heat source by deflecting the sensor to the greater degree. Then, either when a predetermined waiting period elapses or a signal is detected during the waiting period, the presence of the heat source is confirmed by deflecting the sensor to a smaller degree.

In the case of the embodiment shown in FIG. 8, the output of the pyroelectric sensor 105 is digitized through the positive signal discriminating circuit 107 and the negative signal discriminating circuit 108. The digitized signal thus obtained is supplied via the input circuit 109 to the microprocessor 110. The microprocessor 110 then detects the signal patterns d and e which are as shown in FIG. 11.

In case that the signal of the sensor 105 is detected during the focusing or zooming operation, the heat source is judged to have moved. The moving direction of the heat source is detected from the pattern of the signal. A follow-up action on the heat source is resumed by deflecting a driving shaft to a small degree in a manner as stated at the steps S13 to S16. Upon detection of the heat source, the operation of the microprocessor goes back to the step S9 to carry out the steps S11 and S12. If the sensor fails to detect the heat source, the driving shaft is deflected to a greater degree to again perform the follow-up or search action for the heat source. If no signal is detected during the processes of the steps S11 and S12, the confirming action is performed by deflecting the driving shaft to a small degree in a manner as stated at the step S13 and subsequent steps after completion of the focusing and zooming operations. During the confirming process, if a signal is detected, it indicates the presence of the heat source in front of the camera. In that event, the operation goes back to the step S9 to carry out the steps S11 and S12 in the above-stated manner. If no signal is detected, it is assumed that the sight of the heat source has been lost. The operation then goes back to the step S3 to make a search for the heat source by deflecting the driving shaft to a greater degree.

In the case of the flowchart of FIG. 12 described above, the heat source is checked to see if it has moved, while keeping the actuator 112 at rest over a predetermined period of time, by making a check to see if any signal is produced from the pyroelectric sensor at the steps S13 and S15. In this instance, either if the predetermined period of time elapses without detection of any movement of the heat source or, if any movement of the heat source is detected before the lapse of the predetermined period of time, the moving direction of the heat source is detected by causing the actuator 112 to operate as stated at the steps S16 to S21. Such being the arrangement, once a heat source is captured within the field, the embodiment follows up the ensuing movement of the heat source. In addition to that function, the embodiment periodically performs a confirming action to see if the heat source still remains within the field after the heat source is captured. While a lens is employed for the optical system of the sensor of this embodiment, the lens of course may be replaced with some reflecting mirror.

Further, the discriminating part 115 may be arranged without mounting it on the camera part 114. While the invention is applied to a camera in this specific embodiment, the invented device may be mounted on a tripod head and arranged to drive the tripod head.

Figure 13:
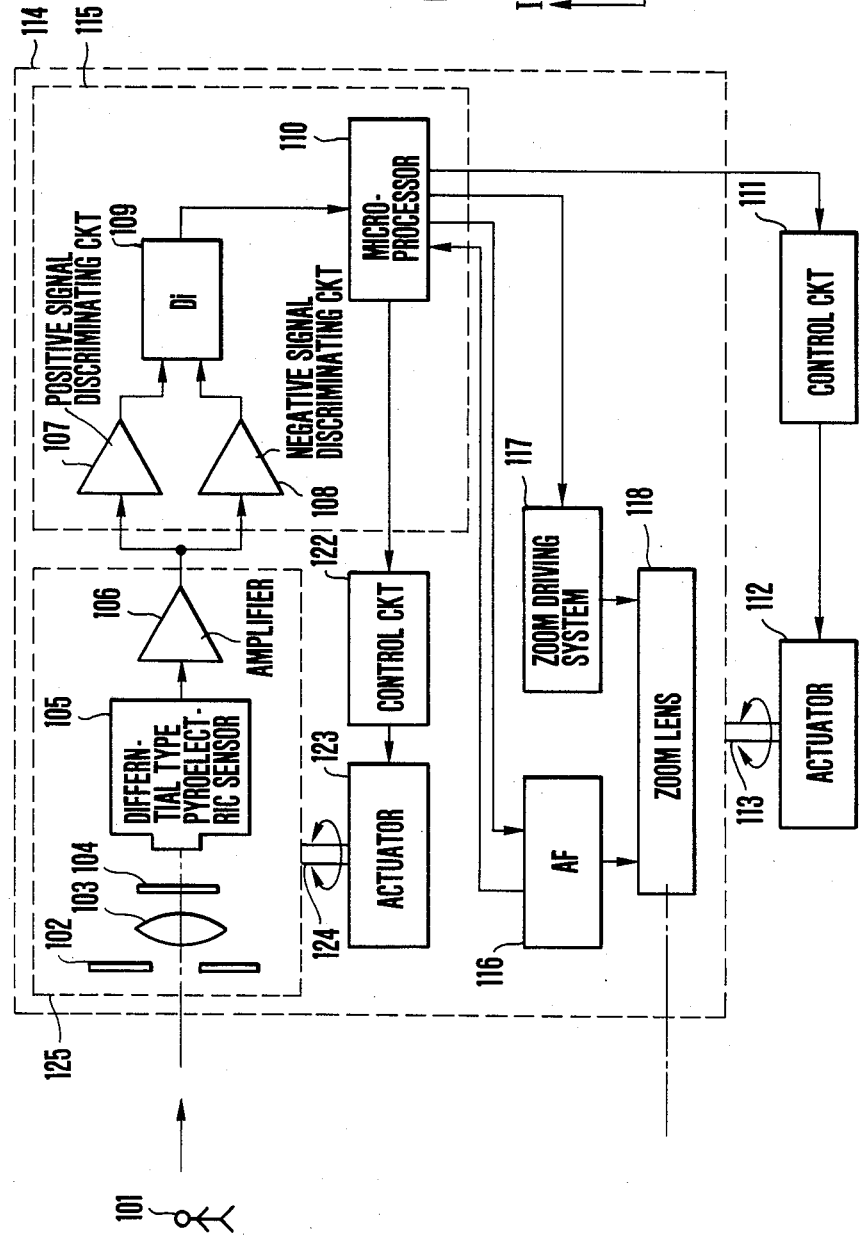
FIG. 13 is a block diagram showing a further embodiment of this invention.

Referring now to FIG. 13, a further embodiment of this invention is arranged as follows: The embodiment has a sensor part arranged to be operable independently of a camera part 114. For that purpose, an actuator 123 and a control circuit 122 are arranged for driving the sensor part 125 alone. During a search for a heat source, a scanning action is performed solely by the sensor part 125. The camera part 114 is arranged to be driven to face a heat source only after detection of the heat source. In the preceding embodiment shown in FIGS. 8 to 12, the camera part and the sensor part are arranged to be driven together. Therefore, during the processes of confirming the presence of the heat source within the field of the sensor by deflecting the actuator 112 to a small degree as stated at the steps S16 to S21 of FIG. 12, the field of the camera fluctuates within a small angle to hinder clear observation of the field by the photographer. Whereas, this problem is solved by this embodiment which is arranged to have the camera part driven only after detection of a heat source. It is another advantage of thie embodiment that, since scanning is accomplished by moving only the sensor part 125, the scanning operation can be performed at a higher speed than the case where a greater mass, consisting of both the sensor part 125 and the camera part 114, is to be driven for scanning.

Figure 14:
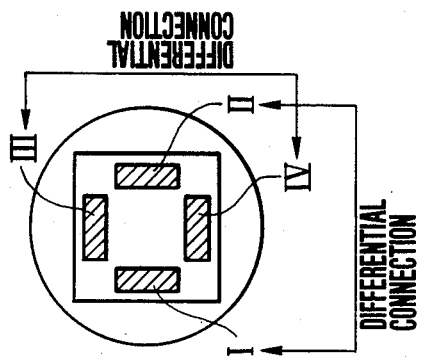
FIG. 14 is a plan view of a pyroelectric infrared ray sensor which includes four pyroelectric elements.

While the embodiment described is arranged to perform the follow-up operation in a horizontal one-dimensional manner for the horizontal movement of a heat source such as human being, however, in accordance with this invention, a two-dimensional follow-up operation can be accomplished by arranging a horizontal detection sensor in combination with a vertical detection sensor. FIG. 14 shows a sensor arranged as an example of such combination. The sensor in this instance consists of four pyroelectric elements I, II, III, and IV. The pyroelectric elements I and II are differentially connected as a pair, while the elements III and IV are differentially connected as another pair. These four elements are thus arranged to form a differential type pyroelectric sensor capable of producing two outputs, which enables the embodiment to perform a two-dimensional follow-up operation with a single sensor by examining the patterns of the two output signals. In this instance, the actuator which is shown in FIG. 8 or in FIG. 13 is arranged to be composed of two actuators, one for the horizontal direction and the other for the vertical direction.

Figure 15:
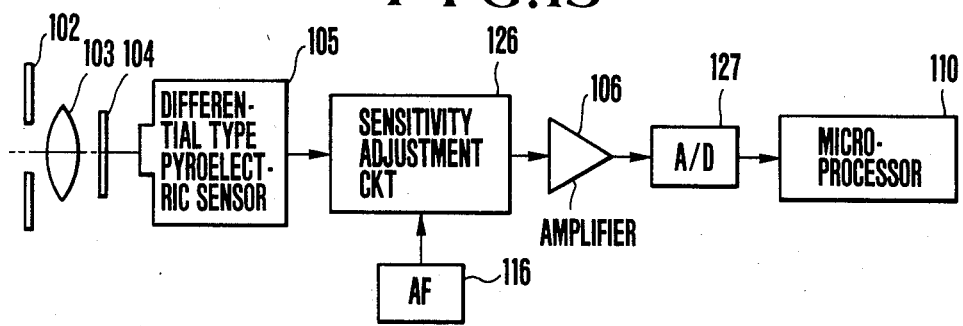
FIG. 15 is a block diagram showing a sensor part provided with a sensitivity adjustment circuit which is arranged to adjust the amplification degree of the output of the pyroelectric sensor.

In the embodiment described, the field of the photo-taking lens is changed according to the output of the differential type pyroelectric sensor; and the object is arranged to be always photographed in a fixed size relative to the image plane irrespective of the distance to the object by changing the magnification of the photo-taking lens according to object distance data obtained from the automatic focusing device 116. In addition to these functions of the preceding embodiments, a further embodiment is arranged to have a better S/N ratio and to be capable of more accurately discriminating the signal pattern indicative of a heat source by driving, for example, in accordance with a signal from the automatic focusing device 116, a lens 103 which is arranged to define the field of the sensor. The details of this embodiment are as described below with reference to FIGS. 15, 16 and 17:

FIG. 15 is a block diagram showing a sensor part 125. The sensor part 125 is provided with a sensitivity adjustment circuit 126 which is arranged to change the amplification degree of the output of the pyroelectric sensor 105 according to distance data obtained from the automatic focusing device 116. At the sensitivity adjustment circuit 126, if the distance data obtained from the automatic focusing device 116 increases by two times, for example, the output of the pyroelectric sensor 105 is amplified by four times by raising the increase to the second power. More specifically, the thermal radiation energy of the object which is a heat source is inversely proportional to the square of distance in general. This characteristic is corrected beforehand by the sensitivity adjustment circuit 126. In other words, the weak radiation energy from an object located at a far distance is amplified beforehand by the sensitivity adjustment circuit 126 to ensure accurate detection. By virtue of this arrangement, the adverse effect of such a high temperature matter as the sun can be ignored.

Figure 16:
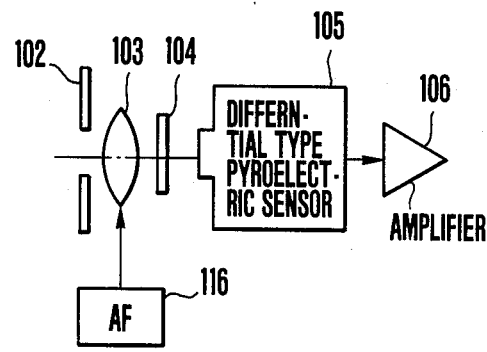
FIGS. 16 and 17 are a block diagram showing a sensor part which is arranged to drive a lens provided in front of the sensor instead of being provided with the sensitivity adjustment circuit.
Figure 17:
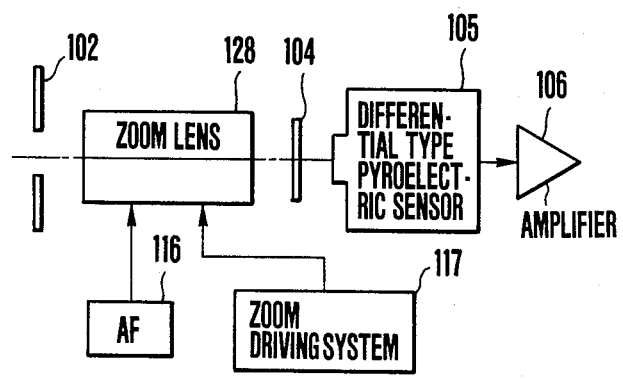

FIGS. 16 and 17 show further examples of the sensor parts 125, wherein in place of the provision of the sensitivity adjustment circuit 126, the output of the pyroelectric sensor 105 is arranged to be corrected by driving the lens 103 according to a signal produced from the automatic focusing device 116. In the case of FIG. 17, a zoom lens 128, which has its focal length arranged to vary with the focal length of a photo-taking lens, is arranged in front of the pyroelectric sensor 105 to permit accurate detection of the radiation energy of an object located at a further distance.

FIG. 18 shows a further embodiment of this invention. In this case, the field of a photo-taking lens and the field of an AF sensor part 140 and a pyroelectric sensor 105 can be differentiated from each other by driving the AF sensor part 140 of an automatic focusing device 116 together with the pyroelectric sensor 105 without driving the photo-taking lens. Referring to FIG. 18 which is a block diagram, the sensor part 125 and the AF sensor part 140 are arranged in one unified body and are arranged to be driven by an actuator 123, a driving shaft 124 and a control circuit 122 separately from the photo-taking lens which is a zoom lens 118. Unlike the preceding embodiment, the optical axis of the pyroelectric sensor is offset from that of the photo-taking lens. An object to be photographed does not have to be placed in the middle part of an image plane. A follow-up operation can be accomplished on the image plane with the image of the object located at a given distance away from the center of the image plane.

Figure 19B:
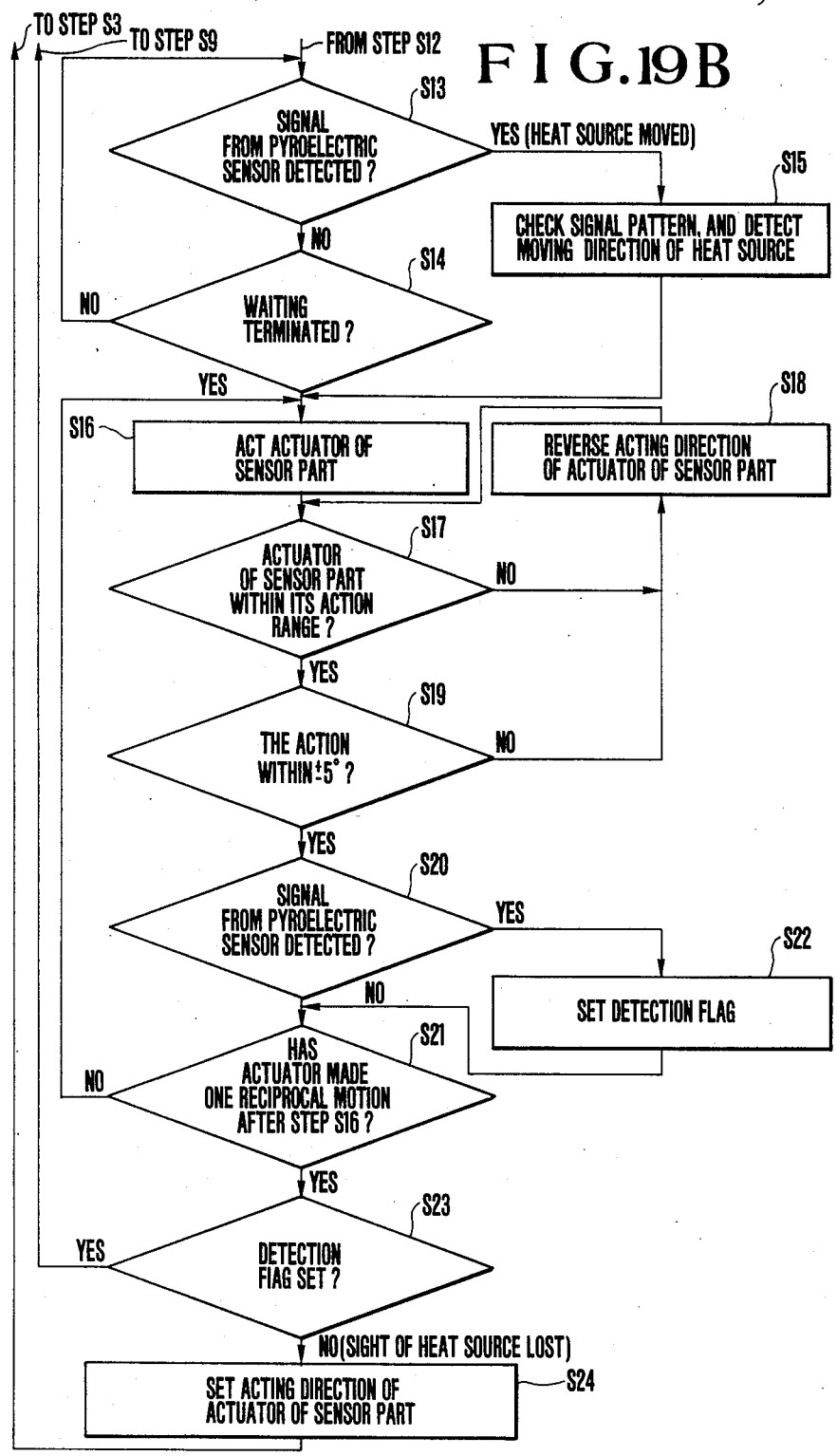
Figure 20:
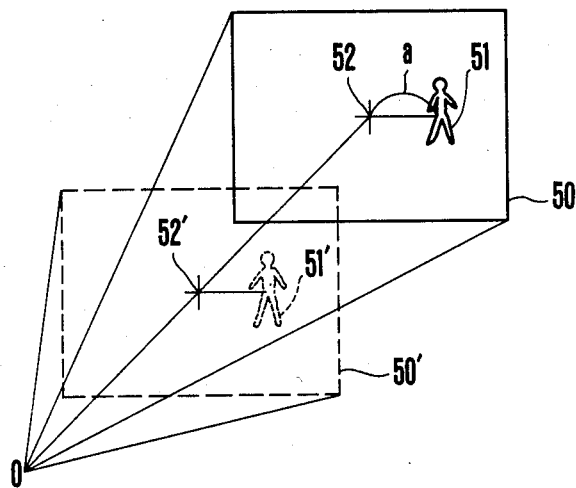
FIGS. 20 and 21 show the operation of the embodiment shown in FIG. 18.

The algorithm which is to be carried out by the microprocessor of the embodiment arranged as shown in FIG. 18, is described as follows with reference to a flowchart of FIG. 19: In FIG. 19, the steps which are for the same functions as those of the steps of the flowchart of FIG. 12 are indicated by the same step numbers and are omitted from the description. In this case, the embodiment is characterized by steps S25 and S26 which are interposed in between the steps S10 and S11 of FIG. 19. The details of these characteristic steps are as follows:

S25: The microprocessor computes a difference between the optical axis direction of the sensor part 125 and that of the camera part 114, or an offset angle, from a distance to the object and a designated picture composition. The details of this computation are described as follows with reference to FIGS. 20 and 21:

FIG. 20 shows a principle on which a photographing object 51 is to be positioned on an image plane 50. This illustration shows a relation between the object distance and an angle of view. Full lines indicate a case where the object is at a far distance. Broken lines indicate a case where the object is at a near distance.

Figure 21:
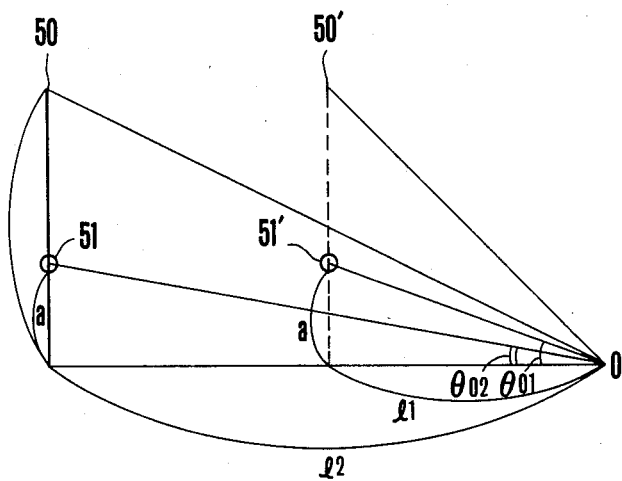

FIG. 21 is a plan view, in which the relation of the image planes 50 and 50' to the objects 51 and 51' is taken on the axis of abscissa and a distance from a focal point "0" on the axis of ordinate in defining the size of the image plane. As shown in FIG. 21, offset angles $\theta 01$ and $\theta 02$ required for always having the image of the object at a given distance a from the center of the image plane in either case of distances l1 and l2 between the camera and the object are in a relation which can be expressed as follows:

$$l1 \tan \theta 01 = l2 \tan \theta 02 = a$$

(wherein a: a known constant)

Therefore, the offset angle is obtainable with the distance l1 or l2 to the object obtained from the AF sensor part 140. With the offset angle obtained through the above-stated computation, the operation of the microprocessor proceeds to the step S26.

S26: Actuators 112 and 123 are driven according to the offset angle thus obtained. This causes the camera part 114 and the sensor part 125 to have the predetermined offset angle between them.

In the embodiment shown in FIG. 18, as mentioned above, the image of the object to be photographed is always kept in a fixed relation to the inside of the image plane, or is located at a given distance from the center of the image plane in this specific embodiment irrespective of the distance from the camera to the object. This feature of the embodiment permits automatic framing. In this specific embodiment, the arrangement permits the so-called one-dimensional automatic framing whereby the camera part 114 and the sensor part 125 are driven only in the horizontal direction. However, the advantageous effect of this embodiment can be enhanced by changing this arrangement to permit two-dimensional automatic framing.

In accordance with this invention, a practical automatic follow-up device is arranged to be capable of automatically locating a heat source, such as a human being, within a photographing field by detecting the moving direction of the heat source can be obtained.

The follow-up action is accomplished with a differential type pyroelectric sensor by detecting a signal pattern representing the moving direction of the heat source. Since the objects to be followed up are limited to such objects as human being animals, etc., that have different temperature from ambient temperature, the follow-up action is not readily affected by other matters such as dust, etc.

Figure 7:
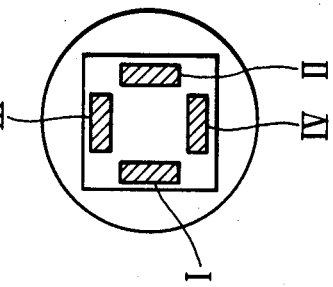
FIG. 7 is a front view showing a differential type pyroelectric infrared ray sensor arranged as another example.

In the embodiments described, the heat detecting means having different fields are the pyroelectric elements 17 and 18 in the case of FIG. 2 or the pyroelectric elements I, II, III and IV in the case of FIG. 7. However, in place of them, heat sensors of some other kind, such as semiconductor heat sensors or thermopiles or the like that detect absolute temperature, are also usable. In the event of use of such sensors, the moving direction of heat sources may be detected by detecting the patterns of changes taking place in the outputs of such sensors.

In accordance with the arrangement of the embodiments described, the heat source which is an object to be photographed is followed up by adjusting the direction of the optical axis of the camera to locate the object within the angle of view of the photo-taking optical system according to the result of detection made by the detecting means which detects the moving direction of the heat source. In addition to the follow-up action, the photographing magnification of the photo-taking optical system is adjusted according to the object distance, so that the object can be always photographed virtually in an unvarying size irrespective of the distance at which it is located.

What is claimed is:

1. An automatic follow-up device for a camera, comprising:

detecting means for detecting a moving direction of a heat source which is an object located within a field of a camera as an object to be photographed;

follow-up means arranged to cause a photo-taking optical system to follow said heat source by changing a direction of an optical axis thereof according to a result of detection made by said detecting means;

distance measuring means for detecting a distance to said object; and control means arranged to have a magnification value of said photo-taking optical system changed according to the distance detected by said distance measuring means to a magnification value at which an image of said object being followed up can be obtained on an image plane of the camera approximately in a constant size.

2. A device according to claim 1, wherein said detecting means includes a pyroelectric infrared ray sensor having a plurality of detecting elements, and discriminating means which detects the moving direction of said heat source according to an output of said sensor.

3. A device according to claim 1, wherein the direction of the optical axis of said photo-taking optical system is changed according to the result of detection made by said detecting means; and a varying degree of a position of said photo-taking optical system in the direction of the optical axis thereof is adjusted according to an object distance detected by said distance measuring means during the following of said heat source in such a way as to locate the image of said object at a given distance away from a center of the image plane of the camera irrespective of the distance to said object.

* * * * *